(12) United States Patent
Green et al.

(10) Patent No.: US 12,361,809 B2
(45) Date of Patent: Jul. 15, 2025

(54) ANTI-THEFT AND TRACKING TAG AND METHODS OF MANUFACTURING SAME

(71) Applicant: CHECKPOINT SYSTEMS, INC., Thorofare, NJ (US)

(72) Inventors: Al Green, Clinton, SC (US); Thomas Craig Weakley, Simpsonville, SC (US); Morui Li, Thorofare, NJ (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 0 days.

(21) Appl. No.: 17/908,393

(22) PCT Filed: Jul. 30, 2021

(86) PCT No.: PCT/US2021/043938
§ 371 (c)(1),
(2) Date: Aug. 31, 2022

(87) PCT Pub. No.: WO2022/026852
PCT Pub. Date: Feb. 3, 2022

(65) Prior Publication Data
US 2023/0087368 A1    Mar. 23, 2023

Related U.S. Application Data

(60) Provisional application No. 63/059,539, filed on Jul. 31, 2020.

(51) Int. Cl.
*G08B 13/24* (2006.01)
*G06K 19/077* (2006.01)
(Continued)

(52) U.S. Cl.
CPC ..... *G08B 13/244* (2013.01); *G06K 19/07722* (2013.01); *G06K 19/07786* (2013.01);
(Continued)

(58) Field of Classification Search
None
See application file for complete search history.

(56) References Cited

U.S. PATENT DOCUMENTS 8,056,814 B2    11/2011    Martin et al.
8,711,046 B2 *   4/2014    Copeland ............... H01Q 21/30
                                                     343/741
(Continued)

OTHER PUBLICATIONS

Patent Cooperation Treaty (PCT), International Search Report and Written Opinion for Application PCT/US2021/043938 filed on Jul. 30, 2021, mailed Nov. 4, 2021, International Searching Authority, US.

*Primary Examiner* — K. Wong
(74) *Attorney, Agent, or Firm* — McDonald Hopkins LLC

(57) ABSTRACT

A dual security tag including an RFID component and an electronic article surveillance (EAS) component, respectively disposed on opposite sides of a PET carrier substrate, is provided. The RFID component may include one or more ultra-high frequency antennae, such as a near field loop antenna and a far field dipole antenna, and an integrated circuit (IC) chip. The EAS component may be provided as an RF device, an acoustic-magnetic (AM) device, a low power Bluetooth (BLE) device, or other suitable device. The security tag may also include a facesheet affixed to the RFID component, a release liner layer affixed to the EAS device, and one or more intermediary films or protective layers. A method for manufacturing a dual security tag is also described.

21 Claims, 5 Drawing Sheets

| Layer No. | Description | Component |
|---|---|---|
| 1 | Facesheet | Facestock & Adhesive |
| 2 | Adhesive | |
| 3 | IC Chip | RFID Component |
| 4 | Conductive Adhesive | |
| 5 | Aluminum Antenna | |
| 6 | Adhesive | |
| 7 | Carrier Substrate | Carrier Substrate |
| 8 | Adhesive | |
| 9 | Protective film | EAS Component |
| 10 | Adhesive | |
| 11 | Resist Ink (Capacitor side) | |
| 12 | Aluminum Capacitor Plate | |
| 13 | Adhesive | |
| 14 | Dielectric Material | |
| 15 | Adhesive) | |
| 16 | Aluminum Coil | |
| 17 | Resist Ink (Coil side) | |
| 18 | Adhesive | Release liner & Adhesive |
| 19 | Liner | |

(51) Int. Cl.
*H01Q 1/22* (2006.01)
*H01Q 1/52* (2006.01)

(52) U.S. Cl.
CPC ....... *G08B 13/2417* (2013.01); *H01Q 1/2225* (2013.01); *H01Q 1/526* (2013.01)

(56) References Cited

U.S. PATENT DOCUMENTS

| | | | |
|---|---|---|---|
| 9,390,603 B2 * | 7/2016 | Li | G06K 19/0725 |
| 2007/0194993 A1 | 8/2007 | Deavours et al. | |
| 2008/0068177 A1 | 3/2008 | Copeland | |
| 2009/0231139 A1 * | 9/2009 | Heurtier | G06K 19/07749 |
| | | | 235/487 |
| 2012/0087065 A1 | 4/2012 | Kim et al. | |

* cited by examiner

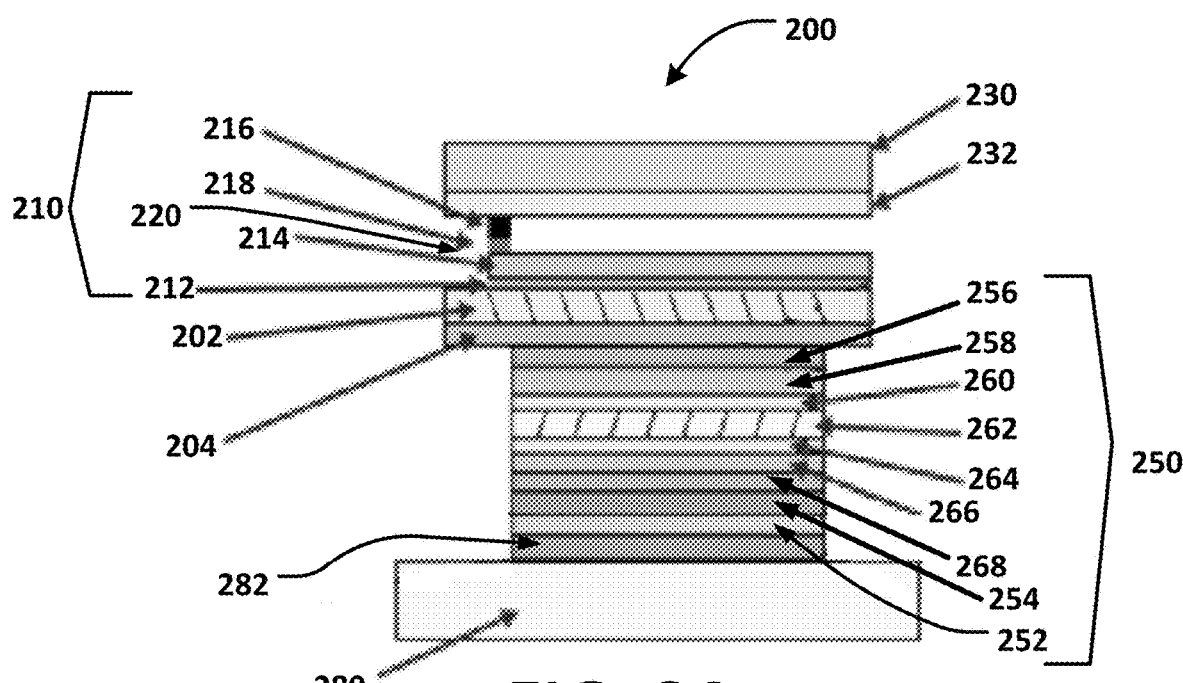

FIG. 2A

| Layer No. | Description | Component |
|---|---|---|
| 1 | Facesheet | Facestock & Adhesive |
| 2 | Adhesive | |
| 3 | IC Chip | RFID Component |
| 4 | Conductive Adhesive | |
| 5 | Aluminum Antenna | |
| 6 | Adhesive | |
| 7 | Carrier Substrate | Carrier Substrate |
| 8 | Adhesive | |
| 9 | Resist Ink (Coil side) | EAS Component |
| 10 | Aluminum Coil | |
| 11 | Adhesive | |
| 12 | Dielectric Material | |
| 13 | Adhesive | |
| 14 | Aluminum Capacitor plate | |
| 15 | Resist Ink (Capacitor side) | |
| 16 | Adhesive | |
| 17 | Protective film | |
| 18 | Adhesive | Release Liner & Adhesive |
| 19 | Liner | |

FIG. 2B

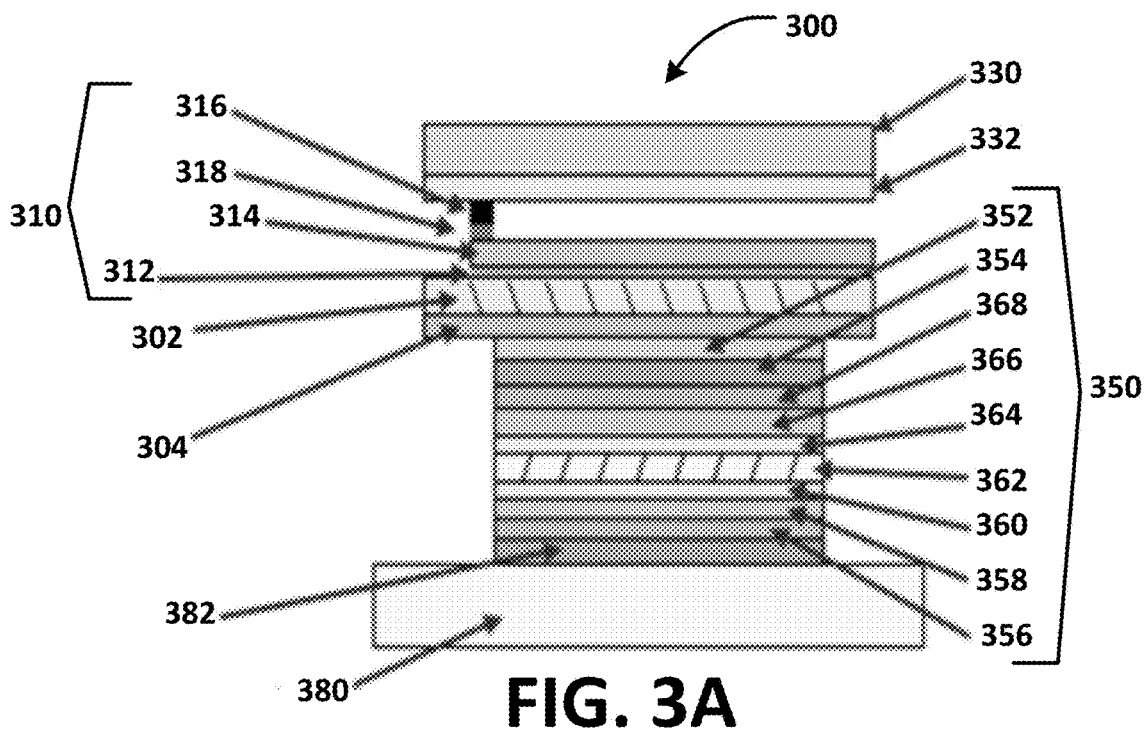

FIG. 3A

| Layer No. | Description | Component |
|---|---|---|
| 1 | Facesheet | Facestock & Adhesive |
| 2 | Adhesive | |
| 3 | IC Chip | RFID Component |
| 4 | Conductive Adhesive | |
| 5 | Aluminum Antenna | |
| 6 | Adhesive | |
| 7 | Carrier Substrate | Carrier Substrate |
| 8 | Adhesive | |
| 9 | Protective film | EAS Component |
| 10 | Adhesive | |
| 11 | Resist Ink (Capacitor side) | |
| 12 | Aluminum Capacitor Plate | |
| 13 | Adhesive | |
| 14 | Dielectric Material | |
| 15 | Adhesive) | |
| 16 | Aluminum Coil | |
| 17 | Resist Ink (Coil side) | |
| 18 | Adhesive | Release liner & Adhesive |
| 19 | Liner | |

FIG. 3B

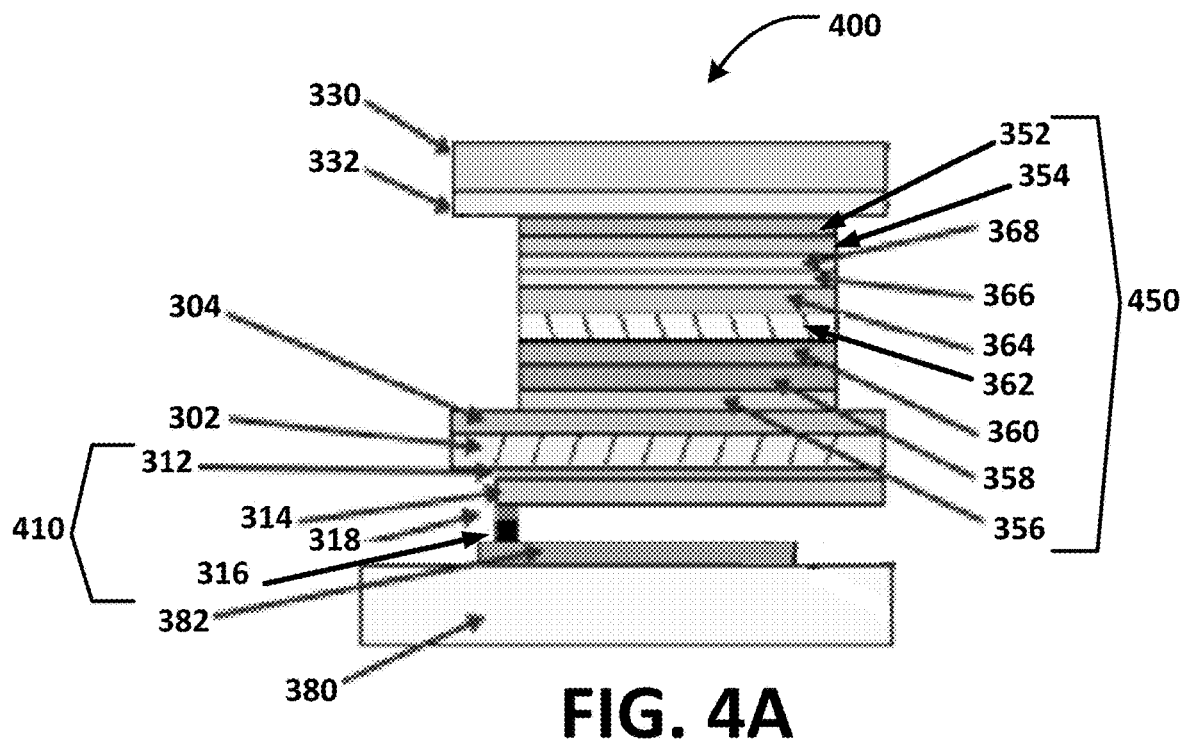

FIG. 4A

| Layer No. | Description | Component |
|---|---|---|
| 1 | Facesheet | Facestock & Adhesive |
| 2 | Adhesive | |
| 3 | Protective Film or Paper | EAS Component |
| 4 | Adhesive | |
| 5 | Resist Ink (Capacitor side) | |
| 6 | Aluminum Capacitor Plate | |
| 7 | Adhesive | |
| 8 | Dielectric Material | |
| 9 | Adhesive | |
| 10 | Aluminum Coil | |
| 11 | Resist Ink (Coil side) | |
| 12 | Adhesive | Carrier Substrate |
| 13 | Carrier Substrate | |
| 14 | Adhesive | RFID Component |
| 15 | Aluminum Antenna | |
| 16 | Conductive Adhesive | |
| 17 | IC Chip | |
| 18 | Adhesive | Release Liner & Adhesive |
| 19 | Liner | |

FIG. 4B

ANTI-THEFT AND TRACKING TAG AND METHODS OF MANUFACTURING SAME

RELATED APPLICATIONS

This application claims priority to U.S. Provisional Application No. 63/059,539, entitled "ANTI-THEFT AND TRACKING TAG AND METHODS OF MANUFACTURING SAME," filed Jul. 31, 2020, which is incorporated herein in its entirety.

TECHNICAL FIELD

The present disclosure relates to security tags, including security tags incorporating both anti-theft features and tracking features, and processes for manufacturing security tags.

BACKGROUND

One of the major concerns of warehouse and store managers regarding the flow of merchandise is protection against theft, including thefts at points of sale, and traceability (namely, identification, location, and movement of the product).

Nowadays more and more anti-theft labels are incorporated into an article during its manufacture or packaging, based on the principle of source tagging. Applying the anti-theft element at the source (i.e., during the manufacture or packaging of the article), eliminates the need to apply it at other stages in the commercial life of the product.

Retail stores may employ various loss prevention techniques to prevent and deter theft of merchandise, including radio frequency identification (RFID) tags and electronic article surveillance (EAS) systems that track inventory and/or alarm under specified conditions likely to be associated with an attempted theft before a point of sale.

Several types of EAS (Electronic Article Surveillance) systems exist in the market. The two biggest-selling systems worldwide are the radio-frequency (RF) anti-theft system, with a coil or closed-loop antenna operating between 5 and 8.2 MHz, and the acoustic-magnetic (AM) system with an element operating at 58 KHz. Both types of EAS systems make use of EAS tags attached to merchandise.

The EAS tags transmit a signal resonating through an antenna when the EAS tags travel through an alternative magnetic field having a frequency which coincides with the antenna resonance frequency. Such alternative magnetic fields may be supplied by terminals at store exits, for example. In the current state of the art, the signal transmitted by the EAS tag does not include any identifier.

For remote identification and location of an object, object identification is possible through the use of radio-frequency identification (RFID) systems. These systems include a reader and a transponder. The reader comprises a radio wave and a magnetic field transmitter that communicates with a transponder (transmitter-receiver) located within its reading field. The transponder comprises an integrated circuit, with or without a memory, and an antenna.

RFID is increasingly used to ensure the proper monitoring of objects or of consumer goods. To this end, a transponder comprising an antenna and an integrated circuit is applied on the article or object to be tracked. The antenna is designed so that its inductance has a specific value such as to form a resonant circuit with the integrated circuit capacitance. The transponder communicates with receivers or readers whose transmitting power and operating frequency range must be adapted to the requirements of the laws and regulations in force in different countries.

For many goods in which anti-theft and tracking is desired, only the EAS element is applied at the source; the UHF element (e.g., RFID) is added at a later stage in the distribution chain.

Therefore, there is a need for a combined anti-theft and tracking tag and process of manufacturing that is described below.

SUMMARY

Disclosed is a combination anti-theft and tracking tag and a process for manufacturing the same. The dual tag includes an RF antenna for use with an anti-theft system, and an antenna for use with a tracking system.

Applying the EAS element and the UHF element to the same tag at the source can provide significant saving in the distribution chain. Additional advantages may be realized in the manufacturing processes for a dual tag, as described herein. Costs in material and labor may be reduced, for example, by taking advantage of similarities between fabrication processes for both the EAS and UHF antennas. In addition, cost savings may be realized by manufacturing a dual tag which is reduced in size. Dual tags manufactured in the manner described below enable a small tag that also maintains a high performance level. Additionally, as described below, the two elements function independently of each other such that UHF element may be used to inventory management and the EAS element may be used with an anti-theft system.

Examples embodiments are described below. An example dual-purpose security label includes a substrate with a first surface and a second surface opposite the first surface, an Electronic Article Surveillance (EAS) unit comprising an EAS antenna, and an ultra-high frequency (UHF) transponder including a UHF antenna and an integrated circuit. The UHF transponder is arranged on the first surface of the substrate and the EAS unit is arranged on the second surface of the substrate. In some examples, a first cover layering is arranged flat on the UHF transponder. In some such examples, a second cover layer is arranged flat on the EAS unit. In some such examples, at least one of the first cover layer or the second cover layer is formed of paper. In some examples, the substrate is formed from a non-conductive plastic material. In some examples, the substrate is formed from polyethylene terephthalate. In some examples, the substrate is formed from a non-conductive, organic material. In some examples, the substrate has a thickness of 50 micrometers. In some examples, the dual-purpose security label includes a shielding bar disposed on one of the first surface or second surface.

An example combination radio frequency identification (RFID) and electronic article surveillance (EAS) tag includes a substrate, an RFID component disposed on the substrate, and an EAS component disposed on the substrate. The RFID component includes at least one ultra-high frequency (UHF) antenna and an integrated circuit. The EAS component includes an antenna. A footprint of the EAS component does not overlap with a footprint of the RFID component. In some examples, the RFID component is disposed on a first side of the substrate and the EAS component is disposed on a second side of the substrate, where the second side is opposite of the first side. In some examples, combination RFID/EAS tag includes a shielding bar disposed on the substrate between the footprint of the EAS component and the footprint of the RFID component. In some such examples, the shielding bar has a shape that corresponds to a shape of a perimeter of the antenna of the EAS component. In some such examples, the shielding bar presents a constant impedance to the UHF antenna of the RFID component. In some examples, the UHF antenna is one of a near field loop antenna or a far field dipole antenna.

An example security tag includes carrier substrate with a first side and a second side, an RFID component disposed on the first side of the carrier substrate, an Electronic Article Surveillance (EAS) component disposed on the second side of the carrier substrate, and a shielding bar disposed on the first side of said carrier substrate. The RFID component includes at least one ultra-high frequency (UHF) antenna, and an integrated circuit (IC). The EAS component includes an antenna, at least one capacitor element, and a film layer disposed between the capacitor element and the antenna of the EAS component. In some examples, a shape of the shielding bar corresponds to a shape of a perimeter of the antenna of the EAS component. In some such examples, the shape of the shielding bar is U-shaped. In some examples, the shielding bar presents a constant impedance to the UHF antenna of the RFID component. In some examples, the shielding bar is a first shielding bar. In such examples, the security tag includes a second shielding bar disposed on the second side of the carrier substrate.

DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 2A is a cross sectional side view of an example dual security tag;

FIG. 2B is a chart identifying the material layers of the dual security tag of FIG. 2A;

FIG. 3A is a cross sectional side view of another example dual security tag;

FIG. 3B is a chart identifying the material layers of the dual security tag of FIG. 3A;

FIG. 4A is a cross sectional side view of another example of a dual security tag;

FIG. 4B is a chart identifying the material layers of the dual security tag of FIG. 4A.

DETAILED DESCRIPTION

Figure 1:
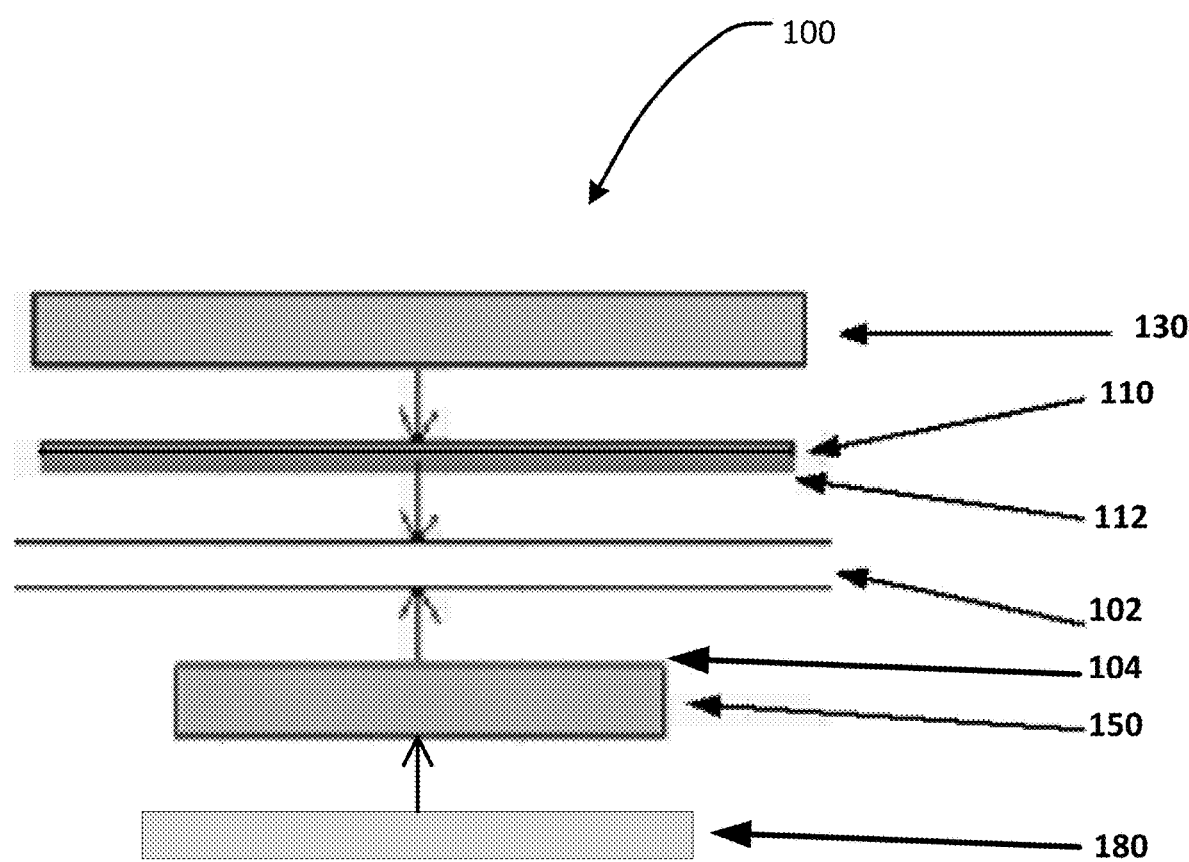
FIG. 1 is an exploded cross sectional side view of an example dual security tag.

Reference will now be made in detail to embodiments of the present teachings, examples of which are illustrated in the accompanying drawings. It is to be understood that other embodiments may be utilized and structural and functional changes may be made without departing from the scope of the present teachings. Features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

The terms "label," "tag," "dual tag," "combination tag," and the like may be used interchangeably, unless context suggests otherwise or warrants a particular distinction among such terms.

Like reference numbers in the various drawings and detailed description indicate like elements.

A combination anti-theft and tracking tag and a process for manufacturing the same is provided herein. The dual tag 100, as shown in FIG. 1, includes a carrier substrate 102 having opposing surfaces. In some examples, the carrier substrate is polyethylene terephthalate (PET). A UHF RFID component 110 is positioned on one surface of the carrier substrate 102 and affixed with an adhesive 112, and an EAS component 150 is positioned on the opposite surface of the carrier substrate 102 with adhesive 104. An adhesive layer may underlie the EAS antenna to form the bottom portion of the tag that is affixed to a release liner 180. The liner 180 may be removed to allow the dual tag 100 to be attached to a sale item or article. A paper facestock 130 may further be positioned over the RFID component 110 to complete the tag 100. Dual tags as described herein may be utilized in traditional physical stores, online stores, or other types of retailers.

The dual tags of the present disclosure can contain stored information, such as in a memory (e.g., read-only memory (ROM), random access memory (RAM), electrically erasable programmable read-only memory (EEPROM), or various other types of memory). In another aspect, a tag may be powered by electromagnetic induction from magnetic fields produced by a transmitter/receiver. The tag may also include a passive transponder that collects energy from interrogating radio waves.

FIG. 2A depicts a dual tag 200 comprising various material layers and including a carrier substrate 202 positioned between a RFID component 210 and an EAS component 250. FIG. 2B is a chart describing each layer of the tag 200 of FIG. 2A and identifying the components comprised of one or more of the layers from the outer most layer (top of the chart) to the inner most layer (bottom of the chart).

In some examples, the carrier substrate 202 may be formed from any suitable polymer material including, but not limited to, cast polypropylene (CPP), polyethylene (PE), oriented polypropylene (OPP), or another type of dielectric material that is suitable for the particular implementation of a dual tag. In some examples, the carrier substrate 202 may be formed from a non-conductive, organic, pulp-derived material (e.g., paper, cardboard, fabric, etc.). Further, the carrier substrate 202 may function as a dielectric. The thickness of the carrier substrate 202 may vary. In some examples, the thickness of the substrate may be a factor in the operational frequencies of the RF capacitor of the dual tag. In some examples, for example, the carrier substrate 202 may be very thin. A thin carrier substrate 202 allows very small RF circuits, which are operational at 8.2 MHz, to be manufactured. In the example illustrated in FIG. 2B, the substrate has a thickness of approximately 50 μm. The choice of materials for the carrier substrate 202 and the thickness of the carrier substrate 202 are two exemplary factors, in addition to other factors, which contribute to the operational frequency of the resulting RF circuit.

In the example shown in FIG. 2A, the RFID component 210 comprises a first metal layer 214 adhered to the carrier substrate 202 with a layer of adhesive 212. The first metal layer 214 may be processed (e.g., by etching) to form an RFID antenna, which may include one or both of a near field antenna and a far field antenna, and one or more connector pads for connecting an integrated circuit (IC) chip. In some examples, the IC chip 216 of the RFID component 210 is tuned to the operable frequency range of the near field and far field antennas. The RFID element IC chip 216 may be connected to the near field antenna by a direct attachment method. For example, IC chip 216 may be affixed to the near field antenna at the one or more connection pads with a conductive adhesive 218. Heat and/or pressure may be used to cure the adhesive 218, thus creating a strong bond between the IC chip and the connection pads. In some examples, adhesive 218 is an anisotropic conductive paste. In manufacturing of the tag 200, a layer of resist 220 may be applied to the surface of the first metal layer 214 opposite of the carrier substrate 202. The resist 220 may be, in one example, an ink or any solvent-based resist, and may be used to form one or more of the near field antenna, far field antenna and the one or more connector pads. The resist 220 may be removed prior to deposition of the adhesive layer 218.

In some examples, the far field antenna is formed as a UHF far field dipole antenna, which may be configured with an appropriate operational range. In some examples, an operational range for the UHF far field dipole antenna may be at resonant frequencies ranging from 0.8 to 2.5 GHz. In some examples, the near field antenna is formed as a UHF near field loop antenna, which may be configured with an appropriate operational range. In some examples, an operational range for the UHF near field loop antenna may be at resonance frequencies ranging from 0.8 to 2.5 GHz. In some examples, the UHF far field dipole antenna and the UHF near field antenna are configured with the same operational range. In the illustrated example, the near field loop antenna and the far field dipole antenna are located on the carrier substrate 202 to be physically isolated from each other. Alternatively, in some examples, these antennas may be located on the carrier substrate 202 to be physically connected to each other.

The EAS component 250, in some examples, comprises a protective film layer 252, adhered to the carrier substrate 202 with an adhesive layer 204. The protective film layer 252 may be PET or paper. A second metal layer 258, with a layer of resist 256 deposited thereon, is adhered to the carrier substrate 202 with an adhesive layer 204. The second metal layer 258 and resist 256 may be processed (e.g., by etching) to form an RF antenna. A dielectric layer 262, which may be provided as an OPP film, is adhesively attached to the second metal layer 258 with an adhesive layer 260, which is adhered to a third metal layer 266 with an adhesive layer 264. A resist 268 deposited on the third metal layer 266 may be processed to form a RF capacitor, including two capacitor electrodes.

A protective film layer 252, which may be PET or paper, may be adhered to third metal layer 266 and resist 268 with an adhesive layer 254. An adhesive layer 282 may underlie the EAS component 250 to form the base portion of the tag 200 that is affixed to a release liner 280 for affixing the tag 200 to a sale item or article. Release liner 280 may be formed of any suitable material, including, but not limited to, paper or plastic film. A facesheet 230 may further be positioned over the RFID component 210 and affixed with an adhesive 232, to form the top portion of the tag 200. The facesheet 230 may be provided as a paper facesheet or a polymeric film, such as a PET layer.

The EAS component 250 may be provided as a RF device. In some examples, the EAS component 250 may alternatively or additionally include an acoustic-magnetic (AM) device, a low power Bluetooth (BLE) device, or other suitable EAS device. In order to effectuate these additional or alternative devices, some of the layers within the EAS component 250 may be different, fewer or greater in number, but the position of the EAS device 250 relative to the carrier substrate 202 and the RFID component 210 would remain the same.

The EAS component 250 may also comprise one or more auxiliary layers, such as a foam spacer, as necessary to maintain performance of the tag 200 in certain applications. In some examples, an auxiliary layer and an adhesive layer are provided between the resist layer 268 and the adhesive 282 for the release liner 280. With UHF RFID and RF components, field interference may occur if the tag is placed on a metal article. The addition of one or more auxiliary layers, may mitigate potential negative field effects.

Adhesive layers 204, 212, 232, 254 and 264 may be any suitable adhesive to create the laminations including, but not limited to, hot melt adhesives, laminating glues, and heat seal glues. Adhesive 282 may be any suitable adhesive, including a hot melt adhesive or a pressure sensitive adhesive such as an emulsion, solvent, acrylic, rubber, etc. Further, adhesive layers 204, 212, 232, 254, 264 and 282 may be provided in any suitable thickness.

Carrier substrate 202, facesheet 230, protective film layer 252, and dielectric layer 262 can be formed of any suitable material including, but not limited to, paper, PET, OPP, or other polymeric materials, depending on the functional properties desired.

As depicted in FIG. 2A, first metal layer 214 has a first thickness, second metal layer 258 has a second thickness, and third metal layer 266 has a third thickness. The actual thicknesses of, and any difference in thicknesses between, the first, second, and third metal layers 214, 258, 266 may, however, vary. Such variations may depend, for example, upon factors including the frequency requirements of the antennas to be formed from the web structure, desired rigidity of the dual tag, design choices made for the tag, design choices which affect subsequent steps of the dual tag fabrication process, as well as other factors. Further, in some examples, the thickness of the first, second, and third metal layers may be the same.

The first, second, and third metal layers 214, 258, 266 may be formed from aluminum. Other materials may be used for the respective layers with the understanding that a part of the metal-substrate-metal web may to be used to form a capacitor, and parts of each of the metal layers are to be used to form antennas. In examples in which these elements are formed for a dual tag, the materials for the web structure are selected to enable the functionality of these elements for the resulting dual tag.

In some examples, the resist layer 256, resist layer 268, and the resist layer deposited (and removed) between the first metal layer 214 and the adhesive layer 218, may be different types of resist material. In some such examples, each resist may be removable by different removal processes. For example, resist layer 256 may be one type of resist material, removable by a first type of removal process, and the resist layer 268 may be a second type of resist material that is removable by a second type of removal process. The removal process for one resist layer 268 may not remove the other resist layer 256. The resist layer 256, for example, may be a resist (e.g., a solvent-based resist) that is not easily removed, and the resist layer 268 may be a resist that is more easily removed than the resist layer 256.

In some examples, the resist layer 256, resist layer 268, and the resist layer deposited (and removed) between the first metal layer 214 and the adhesive layer 218 may be the same resist material. In some examples, wherein the all of the resist layers are the same, all the resist material may be removed in a single removal step. One, or all, of the resist layer 256, resist layer 268, and the resist layer deposited (and removed) between the first metal layer 214 and the adhesive layer 218 may be a printable resist material, such that one or more of deposition steps of the fabrication process may include printing the first or second resist onto the respective metal layers.

Examples of a dual tag are also illustrated in FIGS. 3A, 3B, 4A, 4B, 5A and 5B. In the example illustrated in FIGS. 3A and 3B, tag 300 is substantially similar to tag 200, with the exception that elements within the EAS component 350 are reversed. FIG. 3B is a chart describing each layer of the tag 300 of FIG. 3A and identifying the components comprised of one or more of the layers from the outer most layer (top of the chart) to the inner most layer (bottom of the chart). As with tag 200, tag 300 includes a carrier substrate 302 positioned between a RFID component 310 and an EAS component 350. The RFID component 310 comprises a first metal layer 314 adhered to the carrier substrate 302 with a layer of adhesive 312. The first metal layer 314 may be processed to form an RFID antenna, which may include one or both of a near field antenna and a far field antenna, and one or more connector pads for connecting an IC chip 316.

IC chip 316 may be affixed to the near field antenna at the one or more connection pads with an adhesive 318, such as an anisotropic conductive paste.

In the example illustrated in FIG. 3A, the EAS component 350 comprises a protective film layer 352, which may be a polymeric film or paper, directly affixed to the carrier substrate 302 with adhesive layer 304. A third metal layer 366, with a layer of resist 368 deposited thereon, is adhered to the protective film layer 352 with adhesive layer 354. The third metal layer 366 and resist 368 may be processed to form a RF capacitor. A dielectric layer 362, which may be provided as an OPP film, is adhesively attached to the third metal layer 358 with an adhesive layer 364. A second metal layer 358 is adhered directly to the dielectric layer 362 via adhesive layer 360. A resist 356 may be deposited on the second metal layer 358 and together they may be processed to form an RF antenna.

An adhesive layer 382 may underlie the EAS component 350 to form the bottom portion of the tag 300 that is affixed to a release liner 380 for affixing the tag 300 to a sale item or article. Release liner 380 may be formed of any suitable material, including, but not limited to, paper or plastic film. A facesheet 330 may further be positioned over the RFID component 310 and affixed with an adhesive 332, to complete the tag 300. The facesheet 330 may be provided as a paper facesheet or a polymeric film, such as a PET layer.

FIGS. 4A and 4B illustrate the material layers of an example tag 400. Tag 400 is substantially similar to tag 200, with the exception that the RFID component and EAS component are inverted within the outermost layers of the tag, with the carrier substrate remaining therebetween. In FIG. 2, the EAS device is positioned proximate to the bottom of the tag 200, and the RFID component is positioned proximate to the top of the tag 200. Whereas, in FIG. 4A, the EAS component 450 is positioned proximate to the top of the tag 400, and the RFID component 410 is positioned proximate to the bottom of the tag 400. This alternative placement of the RFID component and EAS component about the carrier substrate may have certain advantages, for example, the EAS component may, in some examples, be sensitive to possible shielding caused by the carrier substrate, or may be mechanically advantaged to be positioned away from the liner.

The EAS component 150, 250, 350, 450 is not particularly limited and can be selected as desired for a particular use or intended application. Further, the configuration of the EAS components shown in FIGS. 2-4 are examples of suitable EAS components. It will be appreciated that the EAS component may have any configuration now known or later available to those skilled in the art.

The examples of the dual tag described herein may be fabricated with conventional processes known to those of skill in the art. In some examples, processing steps may be performed in any order, and those of skill in the art will recognize that by changing the order, some parts of the process may be modified to accommodate the change in order of the process steps. For example, fabrication of the antennas may proceed by deposition of one or more types of resist material onto the respective metal layers. These resist deposition steps may be performed in any desired order. Further, the resist deposition steps may be performed concurrently, e.g., if the same resist material is used in two or more of the deposition steps. In some examples, a dual tag of the present disclosure is fabricated by first spot applying an EAS component directly onto a release liner, and subsequently spot applying a RFID component thereto. This provides the advantage of permitting different types of EAS component—RF, AM, BLE—to be selected and applied to the tag.

Figure 5:
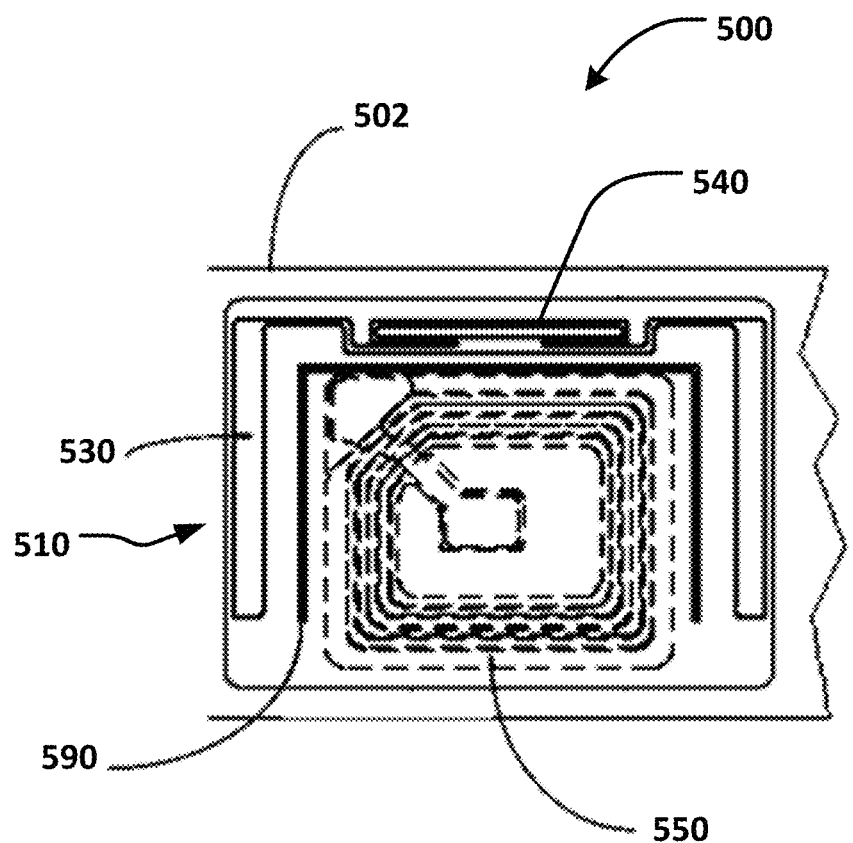
FIG. 5 shows a top elevation view of an example of a dual security tag with antennas formed thereon.

An example of a tag 500 having etched antennas of an RFID component 510 and an etched antenna of an EAS component 550 is shown in FIG. 5. The etched antennas of the RFID component 510, including an inner loop 530 and a dipole 540 of a far field antenna, and EAS component 550 are provided on opposite sides of a carrier substrate 502. In the illustrated example, the footprint of the EAS component 550 does not overlap the footprint of the RFID component 510.

The tag 500 also includes a shielding bar 590 which can provide the benefit of presenting the UHF antenna of the RFID component 510 with a constant impedance regardless of the size and location of the EAS component 550, due to spotting tolerances which may, in some examples, be approximately +/−3 MHz. Where the EAS component 550 substantially fills the entire area within the shielding bar 590, the shielding bar 590 may have little impact on the overall tuning of the tag with respect to the spotting tolerances. However, where the EAS component 550 does not substantially fill the entire area within the shielding bar 590, the shielding bar 590 provides the added advantage of avoiding the need to re-tune the UHF antenna.

FIG. 5 illustrates an example configuration and arrangement of the shielding bar 590. In some examples, the shielding bar can be disposed on the opposite side of the carrier substrate 502 from what is shown in FIG. 5. In some examples, the label can be provided with two or more shielding bars. In some examples comprising multiple shielding bars, the shielding bars can each be disposed on the same side of the carrier substrate. In some such examples, the shielding bars can be disposed on opposing sides of the carrier substrate. In some examples, the shielding bar can be integrated with or integrally formed with the EAS component.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A dual-purpose security label comprising:
a substrate with a first surface and a second surface opposite the first surface;
an Electronic Article Surveillance (EAS) unit comprising an EAS antenna and at least one capacitor element; and
an ultra-high frequency (UHF) transponder including a UHF antenna and an integrated circuit; and
wherein the UHF transponder is arranged on the first surface of the substrate and the EAS unit is arranged on the second surface of the substrate, and the footprint of the EAS unit does not overlap a footprint of the UHF transponder.

2. The dual-purpose security label of claim 1, further comprising a first cover layering arranged flat on the UHF transponder.

3. The dual-purpose security label of claim 2, further comprising a second cover layer arranged flat on the EAS unit.

4. The dual-purpose security label of claim 3, wherein at least one of the first cover layer or the second cover layer is formed of paper.

5. The dual-purpose security label of claim 1, wherein the substrate is formed from a non-conductive plastic material.

6. The dual-purpose security label of claim 1, wherein the substrate is formed from polyethylene terephthalate.

7. The dual-purpose security label of claim 1, wherein the substrate is formed from a non-conductive, organic material.

8. The dual-purpose security label of claim 1, wherein the substrate has a thickness of 50 micrometers.

9. The dual-purpose security label of claim 1 further comprising a shielding bar disposed on one of the first surface or second surface.

10. A combination radio frequency identification (RFID) and electronic article surveillance (EAS) tag comprising:
a substrate;
an RFID component disposed on the substrate, the RFID component comprising at least one ultra-high frequency (UHF) antenna and an integrated circuit;
an EAS component disposed on the substrate, the EAS component comprising an antenna, a footprint of the EAS component does not overlap a footprint of the RFID component.

11. The combination RFID/EAS tag of claim 10, wherein the RFID component is disposed on a first side of the substrate and the EAS component is disposed on a second side of the substrate, the second side opposite the first side.

12. The combination RFID/EAS tag of claim 10, further comprising shielding bar disposed on the substrate between the footprint of the EAS component and the footprint of the RFID component.

13. The combination RFID/EAS tag of claim 12, wherein the shielding bar has a shape that corresponds to a shape of a perimeter of the antenna of the EAS component.

14. The combination RFID/EAS tag of claim 12, wherein the shielding bar presents a constant impedance to the UHF antenna of the RFID component.

15. The combination RFID/EAS tag of claim 12, wherein the shielding bar is arranged on a same side of the substrate as the EAS component.

16. The combination RFID/EAS tag of claim 10 wherein the UHF antenna is one of a near field loop antenna or a far field dipole antenna.

17. A security tag comprising:
a carrier substrate having a first side and a second side;
an RFID component disposed on the first side of the carrier substrate and comprising at least one ultra-high frequency (UHF) antenna, and an integrated circuit (IC);
an Electronic Article Surveillance (EAS) component disposed on the second side of the carrier substrate and comprising an antenna, at least one capacitor element, and a film layer disposed between said capacitor element and the antenna of said EAS component; and
a shielding bar disposed on the first side of said carrier substrate,
wherein a footprint of the EAS component does not overlap a footprint of the RFID component.

18. The security tag of claim 17, wherein a shape of the shielding bar corresponds to a shape of a perimeter of the antenna of the EAS component.

19. The security tag of 18, wherein the shape of the shielding bar is U-shaped.

20. The security tag of 17, wherein the shielding bar is a first shielding bar, and wherein the security tag further comprises a second shielding bar disposed on the second side of said carrier substrate.

21. The security tag of 17, wherein the shielding bar presents a constant impedance to the UHF antenna of the RFID component.

* * * * *